United States Patent
Enos

Patent Number: 4,921,674
Date of Patent: May 1, 1990

[54] GRAVITY FEED APPARATUS AND METHOD FOR FUMIGATION, DETOXIFICATION AND NUTRIFICATION OF PLANT SEED

[76] Inventor: Quentin M. Enos, 8832 Elk Grove Way, No. 203, Las Vegas, Nev. 89117

[21] Appl. No.: 240,996

[22] Filed: Sep. 6, 1988

[51] Int. Cl.⁵ .............................................. A61L 2/16
[52] U.S. Cl. ..................................... 422/28; 47/57.6; 47/DIG. 9; 118/303; 118/676; 118/684; 118/692; 422/32; 422/112; 422/295; 427/4; 427/212
[58] Field of Search .............. 47/57.6, DIG. 9; 427/4, 427/212; 422/28, 32, 295, 112; 118/692, 303, 676, 684

[56] References Cited

U.S. PATENT DOCUMENTS

| | | | |
|---|---|---|---|
| 1,473,165 | 11/1923 | Steigmeyer | 47/DIG. 9 |
| 1,894,058 | 1/1933 | Rice | 47/DIG. 9 |
| 2,197,792 | 4/1940 | Erickson | 118/303 X |
| 2,452,935 | 11/1948 | Kemp | 47/DIG. 9 |
| 3,155,542 | 11/1964 | Cordell et al. | 47/DIG. 9 |
| 3,707,136 | 12/1972 | Kostas | 118/303 |
| 3,740,557 | 6/1973 | Kaushansky et al. | 47/DIG. 8 |
| 3,767,362 | 10/1973 | Griffin et al. | 422/32 X |
| 4,133,638 | 1/1979 | Healey | 422/32 |
| 4,261,139 | 4/1981 | Pogue | 47/DIG. 9 |
| 4,780,279 | 10/1988 | Enos | 426/320 X |

OTHER PUBLICATIONS

Price et al, J. Food Protection, 45(4), 1982, p. 341.
Applebaum et al., J. Food Protection 45(8), 1982, p. 752.
Price et al., J. Assoc. Off. Anal. Chem., 64(6), 1981, p. 1383.
Amos et al., Pyrethrin Post, 14(3), pp. 72-76.
Dove, Trans 9th Int. Congr. Ent 1 (1952), p. 875.
Dove et al., Agric. & Food Chem. 3(11), 1955, p. 932.
Jorgensen et al., J. Agric. Food Chem. 29(3), 1981, p. 555.

*Primary Examiner*—Barry S. Richman
*Assistant Examiner*—Jill Johnston
*Attorney, Agent, or Firm*—David G. Rosenbaum & Associates

[57] ABSTRACT

A gravity feed apparatus has a plurality of deflecting baffles positioned within a treatment chamber to disperse a flow of plant seed within a treatment chamber and apply sprays of a chemical solution used to treat the plant seed.

16 Claims, 1 Drawing Sheet

U.S. Patent
May 1, 1990
4,921,674
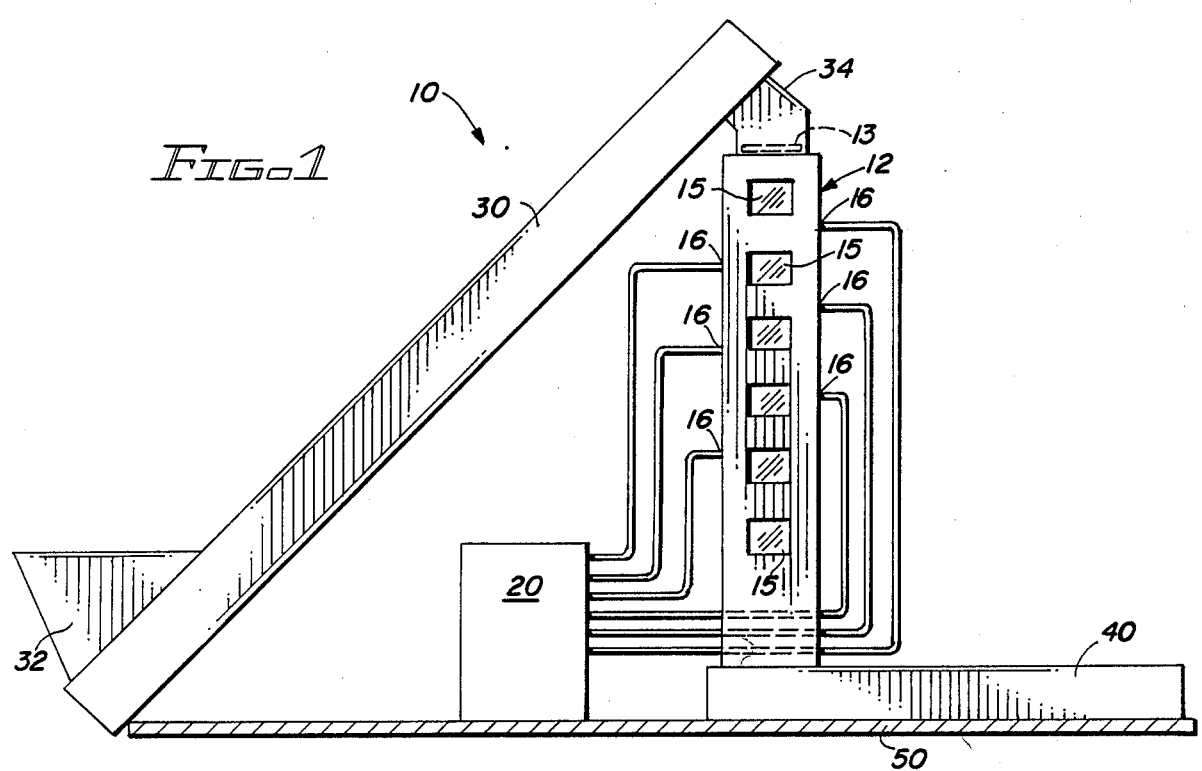
Fig. 1
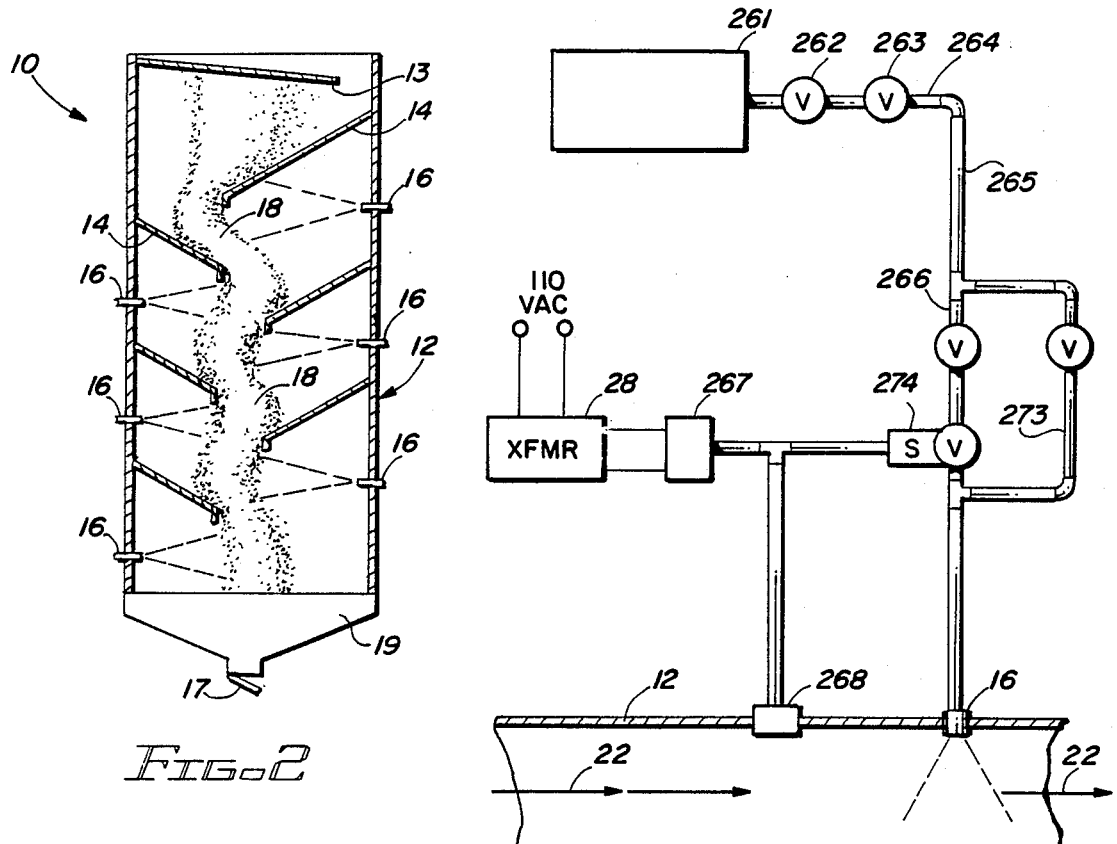
Fig. 2
Fig. 3

GRAVITY FEED APPARATUS AND METHOD FOR FUMIGATION, DETOXIFICATION AND NUTRIFICATION OF PLANT SEED

BACKGROUND OF THE INVENTION

The present invention relates generally to an apparatus and method for applying various chemical solutions to plant seed such as rice, corn, cottonseed, soybeans, peanuts, wheat, barley and other seeds. More particularly, the present invention relates to a gravity feed apparatus having a plurality of deflecting baffles positioned to disperse a flow of plant seed within a treatment chamber and apply sprays of the chemical solution used to treat the plant seed. The present invention further relates to an apparatus and method for applying fumigating, detoxifying and nutrifying chemical substances to the seed flow within the treatment chamber of the present apparatus. Further, the inventive apparatus and method have been found effective for aflatoxin $B_1$ and $B_2$ suppression, for extermination of pink boll worm and weevils which commonly infest and contaminate the nation's seed supply and food chain. In addition to the efficacious fumigant and detoxicant activity of the present invention, increases in nutrient values of the treated seeds have been noted.

Protracted storage of grains and seeds provides an ideal environment for growth of the molds *Aspergillus flavus* and *Aspergillus glaucus*. *A. flavus* produces the highly toxic aflatoxins of which the $B_1$ component have an $LD_{50}$ of less than 30 micrograms for day-old ducklings and has been shown highly toxic to many of grain-fed animals, including swine, calves, rabbits, pheasants, chickens, turkeys and ducks. Toxicity manifests itself in carcinogenic hemmorages in lung and brain tissue and causes generalized tissue edema and liver necropathy.

At present time, fumigation and detoxication of the nation's seed supply has been accomplished by employing the highly toxic chemicals phostoxin and methyl bromide. Despite their inherent toxicity these two chemicals are the major fumigants and detoxicants currently employed by growers and/or seed treatment facilities to comport with the United States Department of Agricultural (hereinafter "USDA") regulations and requirements for qualification for the Phyto-Sanitary Certificate of Approved Fumigation which is required for interstate transport of treated seed.

Current methodology and regulation mandates, for example, that cotton planting seed stored for interstate transport must be tarped, treated and retained in such state for at least five days before transportation from the storage area. The five day retention period has been found to be the optimum time permissible for insuring safe levels of residual phostoxin or methyl bromide toxicity. This retention period had been tremendously burdensome to cotton gins which do not have endless seed storage capacity and must, at times, abandon or ignore proper storage procedures.

Planting and feed seed growers have, accordingly, suffered significant loss of revenue due to the regulatory storage period to insure safe levels of phostoxin and methyl bromide toxicity levels upon interstate transport of the seed. It has been found desirable, therefore, to eliminate these commonly employed toxic chemicals, as the major fumigants and detoxicants for seed treatment. Moreover, it has been determined that by employing alternative fumigants and detoxicants having less toxicity, the requisite seed retention period may be reduced from five days to a period of forty-eight to seventy-two hours. This reduced storage period results in far quicker turnaround times for the seed growers as well as the seed transporters in interstate commerce.

In accordance apparatus and method of fumigation and detoxification of seeds, the present invention has been found to achieve a more complete effective coating of each seed with a concomitant increase in fumigant and detoxicant activity. It well known that ammonia, in various forms, exhibits aflatoxin suppression activity in cottonseed at ambient temperature and pressure. See, e.g., Jorgensen, K. V., et al, "Atmospheric Pressure-Ambient Temperature Reduction of Aflatoxin $B_1$ in Ammoniated Cottonseed," *J. Agric. Food Chem.*, Vol 29, No. 3, p. 555; Price, R. L., et al, "Ammoniation of Whole Cottonseed at Atmospheric Pressure and Ambient Temperature to Reduce Aflatoxin $M_1$ in Milk," *J. Food Protection*, Vol. 45, March, 1982, p. 341; and, U.S. Pat. No. 3,429,709 issued Feb. 25, 1969 to Masri, et al. entitled "Process for De-Toxifying Substances Contaminated with Aflatoxin" which discloses a method of ammoniation of plant seed under high pressure and temperature.

Heretofore, however, it has been found exceedingly difficult to employ anhydrous ammonia in a detoxification system operating at ambient temperature and pressure. The principal problem encountered with ammoniation treatment to detoxify aflatoxin contaminated seed has been pH control. It is well known that an overly alkaline or overly acidic pH will rapidly degrade the nutrient value of the seed or kill it altogether. Furthermore, an overly alkaline pH causes alkaline hydrolysis which causes rapid decomposition of fumigants or pesticides commonly applied prior to, concurrently with, or shortly after treatment with the ammonia detoxicant. As a result of this difficulty in pH control, there has been an inability on the part of those skilled in the art to develop an apparatus and method of detoxification and fumigation which effectively reduces the seed storage time and significantly increases fumigant activity and duration.

Another principal concern to seed producers is insect damage during storage. Frequently, large amounts of seed will be stored for periods up to a year, during which time, the vast majority of the seed is exposed to insect infestation and damage. The annual monetary losses resulting from insect damage have, for a considerable time, been substantial and continue to mount. Accordingly, seed producers have sought, for a long period of time, an effective fumigant having a long lasting fumigant activity to protect the seed from insect infestation during its period of storage. Currently, the majority of seed producers are employing the toxic, though USDA approved, chemicals phostoxin and methyl bromide to control insect infestation in stored seed. However, these chemicals are highly toxic and exceedingly dangerous to handle.

It is well known, to those skilled in the art, that organic pyrethrins exhibit potent fumigant activity and protects seeds and grains from insect damage while exhibiting lower toxicity to humans than phostoxin and methyl bromide. Organic pyrethrin has been mixed with piperonyl butoxide, a synergist, in both water and oil based emulsions to achieve a protective biocidal activity for up to one year when applied to various grains and fruits. See, e.g., Dove, W. E. et al, "Protection of Stored Grain with Sprays of Pyrethrins-Piperonyl Butoxide Emulsion," *Agric. and Food Chem*, Vol. 3, No. 11, November 1955 pp. pp 932–936; Dove, W. E., "Piperonyl Butoxide and Pyrethrins for the Protection of Grains and Similar Products from Insect Damage," *Trans. Ninth Int. Congr. Ent.*, Vol. 1, 1952, pp. 875–879; Amos, T. G., et al., "Laboratory Evaluation of Pyrethrins for use on Processed Sultanas as a Protectant against Insect Infestation," *Pyrethrum Post*, Vol. 14, No. 3, pp. 72–75; and Amos, T. G., et al., "Use of Synergised Pyrethrins to Protect Processed Sultanas from Insect Attack," *Pyrethrum Post*, Vol. 14, No. 3, pp. 76–78.

Heretofore, however, it has been found exceedingly difficult to employ a pyrethrin/piperonyl butoxide fumigant in high volume commercial applications. The primary difficulties encountered in translating laboratory data to commercial application of organic pyrethrins as a fumigant for stored grain, have been pH control, a high susceptibility to alkaline hydrolysis and instability in air and sunlight.

SUMMARY OF THE INVENTION

Accordingly, it is an object of the present invention to provide a system for the fumigation, detoxification and nutrification of plant seeds, including rice, corn, cottonseed, soybeans, peanuts, wheat, barley and other seeds.

It is another object of the present invention to provide a system for ammoniation of the seed with anhydrous ammonia, at ambient temperatures and pressures, for aflatoxin suppression and nutrient enhancement of the seed.

It is a further object of the present invention to provide a commercially useful system for ammoniation of plant seed with anhydrous ammonia in a gravity feed apparatus having an input conveyor, a treatment chamber adapted to provide a dispersed flow of seed through the treatment chamber, an output conveyor, a treatment chemical source, and a spraying apparatus for introducing the treating chemicals into the treatment chamber.

It is still a further object of the present invention to provide a commercially useful system for aflatoxin suppression by ammoniation of plant seed wherein the anhydrous ammonia spray is automatically controlled by pressure-feed back controls from the treatment chamber to the ammonia source with a manual by-pass control.

It is yet another object of the present invention to provide a commercially useful system for fumigation of plant seed with organic pyrethrins.

It is a further object of the present invention to provide a commercially useful system for fumigation of plant seed with organic pyrethrins in conjunction with aflatoxin suppression by treatment with anhydrous ammonia in a gravity feed apparatus having an input conveyor, a treatment chamber adapted to provide a dispersed flow of seed through the treatment chamber, an output conveyor, a treatment chemical source, and a spraying apparatus for introducing the treating chemicals into the treatment chamber.

These and other objects, features and advantages hereinafter disclosed, will become more apparent from the following, more particular, description of the preferred embodiments of this invention, as illustrated in the accompanying drawings, wherein like features are identified by like reference numerals.

BRIEF DESCRIPTION OF THE ACCOMPANYING DRAWINGS

FIG. 1 is a side elevational, partial cross-sectional view of the fumigation and detoxification system according to the present invention.

FIG. 2 is a side elevational, partial cross-sectional view of the treatment chamber of the fumigation and detoxification system according to the present invention.

FIG. 3 is a diagramatical view of a spray control portion of the fumigation and detoxification system according to the present invention.

DESCRIPTION OF THE PREFERRED EMBODIMENT

With reference to the accompanying Figures, there is shown a gravity drop seed treatment apparatus 10 according to the present invention. The gravity drop seed treatment apparatus 10 has a seed input 32, such as a hopper into which trucks may dump seed, and an input conveyor 30 which may be any conventional screw-type or pneumatic conveyor.

Input conveyor 30 transports the seed from the seed input 32 to the top 34 of the gravity drop apparatus 10. A weight actuated door 13 seals the top of the gravity drop apparatus until a desired quantity of seed, measured by weight, is deposited thereupon from the input conveyor 30. The gravity drop apparatus 10 defines a vertically oriented inner treatment chamber 12. A plurality of angled baffles 14 are serially disposed on opposing walls of the treatment chamber 12. According to the preferred embodiment of the present invention, the height of each of the plurality of angled baffles 14 is adjustable within the treatment chamber 12. A plurality of spray nozzles 16 protrude into the treatment chamber 12 and communicate with a spray source 20 which contains the treatment chemicals. Each of the plurality of spray nozzles 16 are associated with one of the plurality of angled baffles 14 and protrude into the treatment chamber underneath the associated angled baffle 14. In this manner, the angled baffle 14 protects the spray nozzle 16 and the spray emanating therefrom being obstructed by seed traveling through the treatment chamber 12.

When the seed is introduced into the treatment chamber 12, it is successively deflected and dispersed by each serially disposed angled baffle 14 thereby establishing a wave-form flow 18 through the treatment chamber 12. Placement of the plurality of spray nozzles 16 and the angled baffles 14 is determined so that the spray of treating material contacts the seed flow 18 approximately at an internodal point in the wave-form flow 18. The internodal point has been found to be the point of maximum dispersion of the seed flow where coating of the seed with the treating chemical is maximized. Moreover, placement of a nozzle 16 underneath an associated angled baffle 14 serves to deflect the seed flow 18 away from the nozzle 16 and thereby protects the nozzle 16 and the spray emanating therefrom obstructions which may be caused by contact with the seed flow.

The treated seed exits the treatment chamber 12 at a lower exit portion 19 thereby dropping onto an outlet conveyor 40, which transports the treated seed to a storage site. According to the preferred embodiment of the present invention, the lower exit portion 19 of the treatment chamber 12 is configured as an angle box, having a generally inverted frustro-conical shape. The angle box configuration of the lower exit portion 19 reduces the velocity of the exiting seed flow thereby causing a dynamic obstruction in the lower exit portion. This dynamic obstruction facilitates formation of a lower air seal in the treatment chamber 12 which minimizes escape of the treatment chemicals from the treatment chamber 12 into the ambient. A lower weight actuated door 17 is provided on the lower exit portion 19. Lower weight actuated door 17 is pre-set to open when a given weight of seed is in the lower exit portion 19. In its closed position, the lower weight actuated door provides a seal against the treatment chemicals escaping the treatment chamber 12. An analogous seal is provided by the weight actuated door 13 at the upper portion of the treatment chamber 12.

Each of the weight actuated doors 13 and 17 are fitted with a switch which is electrically coupled to the conveyors 30 and 40 as well as to a regulators associated with the spray nozzles 16. Those skilled in the art will appreciate that various conventional electronic switches and electronic couplings may be used to control movement of the conveyors 30 and 40 and emission of spray from the spray nozzles 16 responsive to the seed flow through the weight actuated doors 13 and 17.

Finally, the seed exits from the lower exit portion 19 of the treatment chamber 12 and is transported by an outlet conveyor 40 to a storage bin or storage area (not shown).

Preferably, but not required to the operation of the present invention, are a pluarlity of windows 15 which expose the interior of the treatment chamber for viewing of the seed flow. Providing such windows 15 permits rapid location of any obstruction in the seed flow. Each of the windows 15 may be capable of being opened to removed a localized obstruction. Further, it is desirable to provide a plurality of access panels or a door (not shown) to expose the interior of the treatment chamber 12 for adjustment of the angled baffle 14 position, changing, clearing or repairing the nozzles 16, or removing any obstruction to the seed flow 18.

To adapt the gravity drop system 10 of the present invention to become a transportable system, it is possible to provide a base 50 onto which the conveyors 30 and 40, the spray source 20 and the treatment chamber 12 may be attached. The base 50 may then be loaded onto a trailer for transportation to a local site for seed processing and local seed storage.

It is desirable, according to the method of the present invention, to introduce distinct treatment chemicals, each from a distinct one of a plurality of spray source supplies 20, into different sets of nozzles 16. In this manner distinct treatment zones may be established within treatment chamber 12, depending upon the selected combination of compatible treatment chemicals. For example, an upper set of nozzles 16 may be operably connected to a water or wetting agent source and a lower set of nozzles 16 may be operably connected to an anhydrous ammonia source. Introduction of the seed into the upper portion of the treatment chamber 12 opens the weight actuated door 13 and trips the electronic switches thereby initiating the flow of water or wetting agent through the upper set of nozzles 16 and into the upper portion of the treatment chamber 12. The lower set of nozzles 16 are also actuated to introduce an anhydrous ammonia spray into the lower portion of the treatment chamber 12. The rapid volume expansion of the anhydrous ammonia due to the liquid-gas phase change, rapidly establishes an upper water or wetting agent-enriched zone in the upper portion of the treatment chamber and an ammoniated zone in the lower portion of the treatment chamber, with a moisture barrier at the interface. Subsequent seed flows through the treatment chamber continuously activate each set of spray nozzles which replenish each treatment zone. Those skilled in the art will recognize that a wide variety of treatment chemicals may in varying combinations be used with the gravity drop apparatus of the present invention.

When running the system with both ammoniation and pyrethrin treatment, it is important that a proper balance of moisture and ammonia be maintained to maintain a substantially neutral pH within the range of about 7.0–7.7. Control of the pH is crucial to the activity of the pyrethrin to prevent alkaline hydrolysis of the organic molecule thereby rendering the pyrethrin an ineffective fumigant.

In operation, it has been found that anhydrous ammonia exhibits activity both as a detoxicant as well as a fumigant. However, in combination with organic pyrethrins, a known fumigant, the biocidal activity of the present invention is significantly enhanced. The present system offers the ability to both detoxify and fumigate plant seed by having the capability of treating the seed substantially concurrently with both anhydrous ammonia and organic pyrethrins.

According to the present invention, the spray nozzles 16 are controlled by automated and manual by-pass systems as disclosed in U.S. patent application Ser. No. 038,301 filed Apr. 14, 1987 by Quentin Enos, the applicant hereof, and is diagrammatically depicted in FIG. 3. A storage tank 261 for holding the liquid to be dispensed supplies a service hose 264 by means of a metering valve 262 with an excess flow safety valve 263. The liquid to be dispensed flows through service pipe 265 and through first and second conduit legs 266 and 273, respectively, each is equipped with a ball valve having seals appropriate to the liquid to be dispensed. First conduit leg 266 is the normal automatic mode utilizing a solenoid valve 274, while second conduit leg 273 provides for a manual operating mode for automatic mode bypass. Solenoid valve 274 is coupled to a transformer 28 which is, in turn supplied with an alternating electrical current. Solenoid valve 274 is activated by an adjustable sensor 268 which senses the air flow 22 in the system at an upstream point immediately prior to the injection point.

While the invention has been particularly shown and described in reference to the preferred embodiments thereof, it will be understood by those skilled in the art that changes in form and details may be made without departing from the spirit and scope of the invention.

I claim:

1. A plant seed apparatus, comprising:

a substantially vertical treatment chamber having a seed inlet at the top thereof and a seed outlet at the bottom thereof, a plurality of angled baffles disposed on opposing walls of said treatment chamber and a plurality of treatment means for applying at least one of a plurality of treatment chemicals to a flow of plant seed in said treatment chamber, wherein each of said plurality of said treatment means is paired with a respective one of said plurality of angled baffles and disposed underneath each respective one of said plurality of angled baffles, wherein said treatment means further comprises a plurality of spray nozzles coupled to a source of said at least of a plurality of treatment chemicals, wherein a flow of said at least one of a plurality of treatment chemicals into said plurality of spray nozzles is regulated by control means for sensing a pressure in said treatment chamber;

first conveyor means for conveying the plant seed to said seed inlet of said treatment chamber; and second conveyor means for conveying the plant seed away from said seed outlet to storage.

2. The plant seed treatment apparatus according to claim 1, wherein said first and said second conveyor means further comprise screw-type conveyors.

3. The plant seed treatment apparatus according to claim 1, wherein said first and said second conveyor means further comprise pneumatic conveyors.

4. The plant seed treatment apparatus according to claim 1, wherein said control means further comprises a sensor switch means disposed in said treatment chamber said sensor switch means being for sensing an obstruction in said treatment chamber and actuating a solenoid valve disposed in a supply line from said source of said at least one of a plurality of treatment chemicals, said solenoid valve being electrically coupled to said sensor switch means and to an electric source.

5. The plant seed treatment apparatus according to claim 4, wherein said at least one of a plurality of treatment chemicals further comprise an organic pyrethrin.

6. The plant seed treatment apparatus according to claim 4, wherein said at least one of a plurality of treatment chemicals further comprises anhydrous ammonia.

7. A method for treating plant seed, comprising the steps of:

transporting the seed to a treatment chamber inlet;

introducing the seed from said treatment chamber inlet into said treatment chamber;

establishing a wave-form flow of the seed in the treatment chamber by providing a plurality of angled baffles on opposing walls of the treatment chamber for deflecting and dispersing the flow of seed in the treatment chamber;

treating the plant seed with at least one of a plurality of treatment chemicals, by spraying one of said plurality of treatment chemicals into an upper portion of said treatment chamber;

spraying a different and distinct one of said plurality of treatment chemicals into a lower portion of said treatment chamber;

flowing the treated seed out of the treatment chamber; and transporting the treated plant seed to a storage area.

8. The method for treating plant seed according to claim 7, wherein said step of treating the plant seed further comprises the step of spraying at least one of a fumigant and a detoxicant onto the plant seed.

9. The method for treating plant seed according to claim 8, wherein said at least one of a fumigant and a detoxicant further comprises anhydrous ammonia.

10. The method for treating plant seed according to claim 8, wherein said fumigant further comprises an organic pyrethrin.

11. A plant seed treatment apparatus, comprising:

a treatment chamber having a seed inlet at the top thereof and a seed outlet at the bottom thereof and a weight actuated door operably associated with each of said seed inlet and said seed outlet, a plurality of angled baffles disposed on opposing walls of said treatment chamber defining a space between opposing pairs of said plurality of angled baffles and a plurality of spray nozzles for applying at least one of a plurality of treatment chemicals to a flow of plant seed in said treatment chamber, wherein said flow of said at least one of a plurality of treatment chemicals into said plurality of spray nozzles is regulated by control means for sensing a pressure in said treatment chamber, wherein each of said plurality of said spray nozzles is paired with a respective one of said plurality of angled baffles and disposed underneath each respective one of said plurality of angled baffles such that a spray of said at least one of a plurality of chemicals is directed at said space defined between opposing pairs of said plurality of angled baffles;

first conveyor means for conveying the plant seed to said seed inlet of said treatment chamber; and second conveyor means for conveying the plant seed away from said seed outlet to storage.

12. The plant seed treatment apparatus according to claim 11, wherein said conveyor means further comprises a screw-type conveyor.

13. The plant seed treatment apparatus according to claim 11, wherein said conveyor means further comprises a pneumatic conveyor.

14. The plant seed treatment apparatus according to claim 11, wherein said control means further comprises a sensor switch means disposed in said treatment chamber said sensor switch means being for an obstruction in said treatment chamber and actuating a solenoid valve disposed in a supply line from said source of said at least one of a plurality of treatment chemicals, said solenoid valve being electrically coupled to said sensor switch means and to an electric source.

15. The plant seed treatment apparatus according to claim 14, wherein said at least one of a plurality of treatment chemicals further comprises an organic pyrethrin.

16. The plant seed treatment apparatus according to claim 14, wherein said at least one of a plurality of treatment chemicals further comprises anhydrous ammonia.

* * * * *

UNITED STATES PATENT AND TRADEMARK OFFICE
CERTIFICATE OF CORRECTION

PATENT NO.  : 4,921,674
DATED       : May 1, 1990
INVENTOR(S) : Quentin M. Enos

It is certified that error appears in the above—identified patent and that said Letters Patent is hereby corrected as shown below:

Column 8, line 42, insert "sensing" after "for".

Signed and Sealed this

Fifteenth Day of October, 1991

Attest:

HARRY F. MANBECK, JR.

*Attesting Officer*  *Commissioner of Patents and Trademarks*